3,549,768
Patented Dec. 22, 1970

3,549,768
ANTIFUNGAL AND ANTIBACTERIAL COMPOSITION AND METHOD CONTAINING CHLOROACETYLATED HYDROXYDIPHENYLS
Jakob Bindler and Ernst Model, Riehen, near Basel, Switzerland, assignors to Geigy Chemical Corporation, Ardsley, N.Y.
No Drawing. Application Jan. 20, 1966, Ser. No. 536,223, now Patent No. 3,293,124, which is a division of application Ser. No. 202,637, June 15, 1962, now Patent No. 3,251,733. Divided and this application Sept. 2, 1966, Ser. No. 581,135
Int. Cl. A01n 9/24; A61k 27/00; A61l 13/00
U.S. Cl. 424—331                             4 Claims

---

ABSTRACT OF THE DISCLOSURE

Compounds of the formula

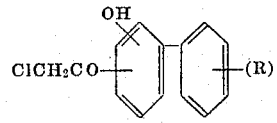

wherein R is hydrogen or p-monochloroacetyl constitute the active ingredients of antimicrobic (antibacterial and antifungal) compositions which are applicable to substrates to be protected from bacteria and fungi.

---

The present application is a division of copending application Ser. No. 536,223, filed Jan. 20, 1966 (now U.S. Pat. No. 3,293,124), which is a division of copending application Ser. No. 202,637, filed June 15, 1962 (now U.S. Pat. No. 3,251,733).

The present invention concerns antimicrobic agents and their use for the combatting of fungi and bacteria and for the protection of organic materials and objects from attack by fungi and bacteria and/or injury due to rotting as well as, as industrial product, the organic materials protected by these antimicrobic agents from attack by fungi and bacteria and/or rot.

By "antimicrobic agents" in the present application are meant protective agents against fungi and bacteria which contain active ingredients having fungicidal or fungistatic and also bactericidal or bacteriostatic properties.

It has been found that araliphatic ketones having two benzene nuclei joined together either direct or by way of an oxygen or sulphur atom or by way of a —SO—, —SO$_2$— or —CH$_2$— group, and if they are bound by way of one of the bridging members mentioned there can be present an additional direct linkage of the two benzene nuclei with formation of a 5-membered middle ring, one of the two benzene nuclei being substituted by the chloroacetyl group —COCH$_2$Cl, and this benzene nucleus also contains a hydroxyl group as further substituent if it is bound to the second benzene nucleus only by the direct linkage, and the second benzene nucleus is unsubstituted or only contains one substituent, i.e., a chlorine atom in any position desired or a nitro or a methylsulphonyl group in p-position to the linking carbon atom, which substituent, if the benzene nuclei are linked together direct or only by way of oxygen, can also be replaced by a chloroacetyl group in the p-position, have excellent antimicrobic, particularly fungicidal or fungistatic and at the same time bactericidal or bacteriostatic properties. In addition they are not very toxic to warm blooded animals and have, in practice, no inflammatory action on the skin or eyes of said animals. They are thus excellently suitable as active substances for combatting fungi and bacteria as well as for the protection of organic materials, from attack by fungi and bacteria and from injury by rot.

The following compounds covered by the formulae given below are embraced by the above general definition of antimicrobic active substances used according to the invention:

(a) Chloroacetylated hydroxydiphenyls of the general formula

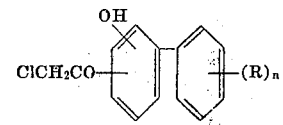

wherein n is the number 0 or 1, and R is a chlorine atom in any position desired or a nitro, methylsulphonyl or monochloroacetyl group in the p-position to the bond linking the nuclei, but R being preferably the monochloroacetyl group in p-position.

(b) Chloroacetylated diphenyl ethers, diphenyl sulphides, diphenyl sulphons, diphenyl sulphoxides and diphenyl methanes of the general formula

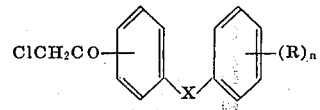

wherein X represents an oxygen or sulphur atom or a —SO—, —SO$_2$— or —CH$_2$— group; R represents a chlorine atom in any position desired or a nitro or methyl sulphonyl group in p-position to the bridging member X and, when X is oxygen, R can also be the monochloroacetyl group in the p-position to the bridging member, and n is the number 0 or 1.

(c) Chloroacetylated dibenzofurans (diphenylene oxides), dibenzothiophenes (diphenylene sulphides), diphenylene sulphones, diphenylene sulphoxides and fluorenes of the general formula

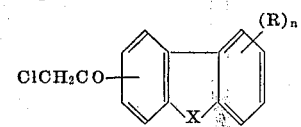

wherein X represents an oxygen or sulphur atom or a —SO—, —SO$_2$— or —CH$_2$— group; R represents a chlorine atom in any position desired or a nitro or methylsulphonyl group, and n represents the number 0 or 1.

In the latter group, those compounds are preferred in which X is an oxygen atom or the methylene group —CH$_2$, and n is 0. (Dibenzofuranes and fluorenes.)

Active substances usable according to the invention which have a chloroacetyl group in each of the two benzene nuclei are therefore: bis-chloroacetyl monohydroxydiphenyls and bis-chloroacetyl diphenyl ethers.

Up to now such araliphatic ketones have been used in particular as starting materials or intermediates in the production of dyestuffs and pharmaceuticals, etc. Nothing, however, has been known with regard to a bactericidal and/or fungicidal action of these compounds.

Those of the active substances to be used according to the invention can easily be produced by known methods.

They are obtained, for example, from diphenyls, diphenyl ethers, diphenyl sulphides, diphenyl methanes, dibenzofurans, fluorenes, etc., possibly substituted as defined, by reaction with 1 or 2 mols of chloroacetyl chloride in the presence of AlCl$_3$ according to Friedel-Crafts.

Also, on reacting diphenyl ether, diphenyl methane, dibenzofuran or fluorene with acetyl chloride according to Friedel-Crafts, first the acetyl group can be introduced into the molecule and then it can be chlorinated.

Chlosoacetyl diphenyl sulphones and chloroacetyl diphenyl sulphoxides can be produced by oxidising the acetyl-diphenyl sulphides produced above according to Friedel-Crafts and then chlorinating the acetyl group.

In general the active substances according to the invention are colourless to pale yellowish coloured bodies which can be purified either by distillation under reduced pressure or by recrystallisation. They are insoluble in water but are easily soluble in the usual organic solvents. This solubility in organic solvents which are used for the so-called dry cleaning of fabrics, enable the active substances to be applied as organic solutions in the form of sprays or dry cleaners in the presence of neutral wetting and cleansing agents. In addition, the active substances can be mixed into paper treamtent liquors or printing thickeners made from starch or cellulose derivatives or they can be used for the impregnation of wood. Also in objects made of synthetic resin such as, e.g., polyvinyl chloride films, etc., as well as in lacquers and paints which contain, e.g., casein or synthetic resin, an effective protection from attack by fungi and bacteria is obtained with the substances usuable according to the invention.

The following compounds can be used, for example, as antimicrobic active substances according to the invention:

5-chloroacetyl-2-hydroxydiphenyl,
3,4'-bis-chloroacetyl-4-hydroxydiphenyl,
5,4'-bis-chloroacetyl-2-hydroxydiphenyl,
4-chloroacetyl-diphenyl ether,
4-chloroacetyl-4'-chlorodiphenyl ether,
4-chloroacetyl-3'-chlorodiphenyl ether,
4-chloroacetyl-2'-chlorodiphenyl ether,
4-chloroacetyl-4'-methylsulphodiphenyl ether,
4-chloroacetyl-4'-nitrodiphenyl ether,
4,4'-bis-chloroacetyl-diphenyl ether,
4-chloroacetyl-diphenyl sulphide,
4-chloroacetyl-4'-chlorodiphenyl sulphide,
4-chloroacetyl-diphenyl sulphone,
4-chloroacetyl-diphenylmethane,
monochloroacetyl-fluorene,
chloroacetyl-dibenzofuran (chloroacetyl-diphenylene oxide).

These and other active substances to be used according to the invention are distinguished by very slight toxicity to warm-blooded animals and cause no irritation to eyes and skin of the animals. These active substances can also be used in practically neutral synthetic washing and cleansing agents in solid form such as tablets or bars, which agents contain, for example, nonionogenic products or fatty acid condensation products as wash active component. The active substances according to the invention have a good action both against bacteria as well as against fungi and they are distinguished in particular by their surprisingly broad range of action. The bactericidal action covers both gram positive as well as gram negative bacteria. Another advantage is their colourlessness or only slight colour which enables them to be used for many purposes for which the known strongly coloured compounds are not suitable.

The antimicrobic active substances is applied to the organic material to be protected either by simply admixing or incorporating the active substance or spraying or impregnating with solutions or suspensions of the active substance. In general, contents of 5 to 20 g. of active substance per litre of treatment liquor are sufficient for an effective protection of the sprayed or impregnated material from attack by fungi and bacteria, rot or formation of mildew spots. Organic material with a content of 0.5 to 2% active substance, calculated on the weight of the material, is generally effectively and lastingly protected against attack by fungi. Organic material to be protected are mainly cellulose materials such as celluose, wood, paper, materials having a synthetic resin basis and also lacquers and paints. However, also other organic substances which tend to mould or rot such as leather, vegetable or animal mucilages and jells, permanent sizings made from polyvinyl compounds, etc., can be protected.

The good activity of the active substances to be used according to the invention against bacteria and fungi can be seen from the laboratory test described below.

By producing solutions of varying concentration of the active substance to be tested in ethylene glycol monomethyl ether (methyl cellosolve) and adding 1.25% of these methyl cellosolve solutions to 20 ml. of agar, nutrient mediums are produced which contain the following 8 final concentrations of active substance in p.p.m. (=parts of active substance per $10^6$ parts substratum): 300; 100; 30; 10; 3; 1; 0.3 and 0.1.

After the agar nutrient medium has solidified, 24-hour-old cultures of the following bacteria and fungi are inoculated:

Bacteria: *Staphylococcus aureus SC 511, Escherichia coli 96, Bacillus mesentericus,* and *Sarcina lutea,*

Fungi: *Aspergillus niger, Penicillium expansum, Fusarium oxysporum,* and *Candida albicans.*

The dishes inoculated with bacteria are incubated for 48 hours at 37° whilst the nutrient mediums inoculated with fungi are kept for 5 days at 28° C., the growth of the organisms on the agar medium is then visually judged. The following table shows the result of the test; the lowest concentration of active substance in p.p.m. (=parts of active substance per 1 million parts of carrier substance) is given with which a complete inhibition of growth could be observed.

The following active substances were tested:

(I) 4-chloroacetyl diphenyl ether,
(II) 4-chloroacetyl-4'-chlorodiphenyl ether,
(III) 4-chloroacetyl-3'-chlorodiphenyl ether,
(IV) 4-chloroacetyl-2'-chlorodiphenyl ether,
(V) 4-chloroacetyl-4'-nitrodiphenyl ether,
(VI) 4-chloroacetyl diphenyl sulphide,
(VII) 4-chloroacetyl diphenyl sulphone,
(VIII) 4-chloroacetyl diphenylmethane,
(IX) chloroacetyl-dibenzofuran (chloroacetyl diphenylene oxide),
(X) 4-chloroacetyl-4'-methylsulphodiphenyl ether,
(XI) 4,4'-bis-chloroacetyl diphenyl ether,
(XII) 2-hydroxy-5-chloroacetyl diphenyl,
(XIII) 2-hydroxy-5,4'-bis-chloroacetyl diphenyl;

TABLE

| Substance | Bacteria | | | | Fungi | | | |
|---|---|---|---|---|---|---|---|---|
| | Staph. aur. | Esch. coli | Bac. mesent. | Sarc. lut. | Asp. nig. | Pen. exp. | Fus. oxysp. | Cand alb. |
| I | 3 | 3 | 10 | 1 | 3 | 10 | 10 | 10 |
| II | 0.3 | 3 | 1 | 0.3 | 10 | 1 | 10 | 10 |
| III | 0.3 | 30 | 3 | 0.3 | 30 | 30 | 3 | 3 |
| IV | 3 | 30 | 3 | 0.3 | 30 | 30 | 3 | 30 |
| V | 3 | 3 | 3 | 3 | 3 | 3 | 3 | 3 |
| VI | 1 | 10 | 1 | 1 | 10 | 3 | 3 | 3 |
| VII | 3 | 30 | 3 | 3 | 300 | 10 | 10 | 10 |
| VIII | 1 | 10 | 3 | 1 | 610 | 3 | 3 | 3 |
| IX | 0.3 | 3 | 3 | 3 | 300 | 3 | 3 | 3 |
| X | 3 | 30 | 30 | 3 | 300 | 30 | 30 | 30 |
| XI | 1 | 1 | 3 | 1 | >300 | 1 | 3 | 3 |
| XII | 3 | 30 | 30 | 3 | 300 | 10 | 30 | 30 |
| XIII | 1 | 10 | 3 | 1 | 300 | 3 | 30 | 10 |

From the above table the uniformly wide action spectrum and the excellent action of the substances used according to the invention, which also covers gram-negative bacteria such as, e.g., *Escherichia coli*, can be seen. The active substances of general Formulae I to III used according to the invention can also be used in combination with other fungicidal and/or bactericidal substances, e.g., with halogenated salicylic acid alkylamides and anilides, halogenated diphenyl ureas, halogenated benzoxazolones, polychlorohydroxydiphenylmethanes, halogenated dioxy-diphenyl sulphides, etc.

On using the active substances according to the invention simultaneously with other bactericidal or fungicidal compounds, often a better action can be determined than would have been expected from the sum of the two effects (synergism).

In the fungistatic test, mixtures of 1-lauryl-2-imino-imidazolidine hydrochloride with many of the active substances according to the invention, show a clear synergistic increase of action. The same is true of mixtures of the active substances according to the invention with 3,4,4'-trichloro-2'-hydroxydiphenyl urea.

In the bacteriostatic test, mixtures of active substances according to the invention with known bacteriostatica such as 2-hydroxy-3,5-dichlorobenzoic acid-3',4'-dichloroanilide, hexachlorophene, 3-trifluoromethyl-4,4'-dichlorodiphenyl urea, etc., also show a clear synergistic increase of action.

Where not otherwise stated, in the following application examples parts are given as parts by weight. Percentages are to be understood as percentages by weight and the temperatures are in degrees centigrade.

EXAMPLE 1.—PAINT 130 parts of an emulsion paint having a 75% content of solid substances and consisting of

| | Parts |
|---|---|
| Chalk | 36 |
| Titanium dioxide | 9 |
| Mowilite DO25 (Hoechst) | 22.5 |
| Belloid TD | 0.5 |
| Pigment paste of about 60% solid component | 10 |
| Water | Ad 100 | are mixed with 8 parts of a 25% stock solution of 4-chloroacetyl-diphenyl sulphone (I) or 4-chloroacetyl-4'-chlorodiphenyl sulphide (II) of 4 - chloroacetyl - 4'-nitrodiphenyl ether (III), ethylene glycol monomethyl ether and dimethyl formamide 1:1 serving as solvents. This produces a paint which contains 2% of active substance calculated on the solid content. In the same way, using 1.6 or 0.32 part of active substances, paints are produced which contain 0.4 and 0.08%, respectively, of active substance calculated on the solid content.

Pieces of cardboard made from wood pulp of about 1 mm. thickness and 6 x 6 cm. square are so painted on both sides that, per sq. metre, 200 grammes of each of the 3 previously prepared mixtures are evenly applied (=1.44 g./72 cm.²). The cardboard pieces are dried for some days and then subjected to the biological test in the following way:

A pumice stone plate of 6 x 6 x 0.5 cm. is laid in a Petri dish of 10 cm. diameter and covered with a 6 x 6 cm. glass plate. The pumice stone plate is saturated with distilled water. The piece of cardboard to be tested is laid on the glass plate and inoculated with 1 ml. of a suspension of spores of the following composition:

Inoculum: 10 ml. of Czapek solution are added to 14-day-old slant agar culture of the fungus *Trichoderma viride* and the surface of the culture is carefully scraped and suspended; it is then filtered through fibreglass the filtrate is used as inoculum. The Petri dishes are then closed and the culture is incubated for 10 days at 28° C. The development of a fungi growth is then estimated.

RESULTS

| Active substance | Concentrations of active substance | | |
|---|---|---|---|
| | 2% | 0.4% | 0.08% |
| I | No growth | Slight growth | Moderate growth. |
| II | do | do | Strong growth. |
| III | do | do | Slight growth. |
| Control without active substance | Strong growth | Strong growth | Strong growth. |

EXAMPLE 2.—PLASTICISER FOR SYNTHETIC RESINS

The active substance 4,4' - bis - chloroacetyl-diphenyl ether is dissolved in suitable concentrations in ethylene glycol monomethyl ether.

4 parts of this solution are mixed with 5 parts of dioctyl sebacate. The insensitivity of the plasticiser so obtained to fungal and bacterial attack is tested as follows: This plasticizer mixture is added to 91 parts of nutrient agar and the agar mixture is poured into plates. After solidifying inoculation is made with a 14-day-old culture of *Aspergillus oryzae* or with a 24-hour-old culture of *Escherichia coli* 96. The inoculum is obtained as follows:

10 ml. of physiological sodium chloride solution are added to each of 14-day-old slant agar cultures of *Aspergillus oryzae* or of 24-hour-old slant agar cultures of *Escherichia coli* 96. The surface of the cultures is carefully scraped and suspended. The suspension is then filtered through fibreglass and the filtrate is used as inoculum.

The nutrient agar used for *Aspergillus oryzae* is Sabouraud-Maltose:mineral salt agar 1:20. If *Escherichia coli* 96 is inoculated, the nutrient agar is nutrient agar: mineral salt agar=1:20.

The ethylene glycol monomethyl ether solutions contain so much active substance that the concentrations, calculated on the plasticizer, are 2.0%, 0.4% and 0.08%. The plates inoculated with *Aspergillus oryzae* are left for 10 days at 28° C., whilst those inoculated with *Escherichia coli* 96 are kept for 48 hours at 37° C. The development of the organisms on the agar surface is then judged.

TABLE

| Concentrations, percent | *Aspergillus oryzae* | *Escharichia coli* |
|---|---|---|
| 2.0 | No growth | No growth. |
| 0.4 | No growth | No growth. |
| 0.08 | growth | No growth. |

EXAMPLE 3.—APPLICATION TO COTTON

Active substance I=4-chloroacetyl - 3'-chlorodiphenyl ether is dissolved in ethylene glycol monoethyl ether in the concentrations of

| | G./1., (gammes/litre) |
|---|---|
| (a) | 1.04 |
| (b) | 5.2 |
| (c) | 26.0 | and active substance II=4-chloroacetyl-diphenylmethane is also dissolved in the same solvent in concentrations of

| | G./1. |
|---|---|
| (d) | 1.04 |
| (e) | 5.2 |
| (f) | 26.0 |

Cotton cambric is dipped for 10 seconds at room temperature in the solution (a), (b), or (c) or in (d), (e) or (f) (liquor ratio 1:10) and the fabric is then wrung out through a mangle to an increase in weight of 38.4. In this way, the fabric is impregnated with the following amounts of active substance, calculated on the weight of the fibre:

|  | Percent |
|---|---|
| (a) or (d) | 0.04 |
| (b) or (e) | 0.2 |
| (c) or (f) | 1.0 |

The fabric is dried in the air and, after complete evaporation off of the solvent, subjected to biological test.

A similar fabric is treated in the same way but only in the solvent without the addition of active substance and this serves as control.

(1) Growth test.—Circles of 40 mm. diameter of the fabric are placed on an agar plate which has been previously inoculated with *Aspergillus niger* and the plate is kept for 10 days at 28° C. and 90% relative humidity. At the end of this time the fungus growth is judged which led to the results given in the table for the corresponding impregnations.

Circles each of 38 mm. diameter are cut from the same pieces of material (a), (b) and (c) or (d), (e) or (f) and the control and used for the following rotting test:

(2) Chactomium test.—Two circular patterns of each material are placed on a suitable mineral salt agar plate and inoculated with 1 ml. of a freshly prepared suspension of spores of a 10-day-old culture of *Chactomium globosum*. The plates are left for 10 days at 28° C. and 90% relative humidity, then the patterns are cleaned, conditioned and their resistance to perforation is tested. The results are expressed in percent of the remaining mechanical solidity calculated on the original solidity before the test. The results obtained by this process are given in the table.

(3) Earth burial test.—Two circular patterns of each of the treated fabrics are laid in 500 ml. jam jars, which were then filled with compost earth of the following composition: 50% of compost, 30% cow dung and 20% sand. The moisture of the earth was 30%. The samples were left for 14 days at 28° C. They were then cleaned and the resistance to perforation was tested. The results are expressed in percent of the remaining mechanical solidity, calculated on the original solidity before the test. The results given in the table were obtained by this process.

RESULTS

| Growth test, growth on test sample | Chactomium test, resistance to perforation of test sample, percent | Earth burial test, resistance to perforation of test sample, percent |
|---|---|---|
| Treatment with solvent alone, strong | 0 | 0 |
| Active substance: |  |  |
| a. None | 100 | 16 |
| b. None | 100 | 94 |
| c. None | 100 | 100 |
| Active substance: |  |  |
| d. Weak | 87 | 0 |
| e. Weak | 100 | 74 |
| f. Weak | 100 | 92 |

EXAMPLE 4.—APPLICATION TO WOOL

Active substance I=4-chloroacetyl-3'-chlorodiphenyl ether is dissolved in ethylene glycol monoethyl ether in the concentrations of

|  | G./l. |
|---|---|
| (a) | 8.0 |
| (b) | 40.0 | and active substance II=4-chloroacetyl-diphenylmethane is also dissolved in ethylene glycol monoethyl ether in the concentrations

|  | G./l. |
|---|---|
| (c) | 8.0 |
| (d) | 40.0 |

Wool muslin is dipped for 10 seconds at room temperatures in the solution (a) or (b) or in (c) or (d) (liquor ratio 1:10) and squeezed out through a mangle to a 25% increase in weight. In this way, the fibre is impregnated with the following amounts of active substance, calculated on the weight of the fibre:

|  | Percent |
|---|---|
| (a) or (c) | 0.2 |
| (b) or (d) | 1.0 |

The fabric is dried in the air and after complete evaporation off of the solvent, subjected to biological test.

A similar fabric is treated in the same way but only in solvent without the addition of active substance and serves as a control in the tests.

Circular patterns are cut from the treated fabrics (a) or (b) or from (c) or (d), each pattern having 20 mm. diameter. These are placed on nutrient agar plates to which 50 p.p.m. of potassium tellurite have been added and which have been inoculated with *Bacillus mesentericus* and the plates are then left for 48 hours at 37° C. After that time, the growth on the fabric is judged visually.

Results

Growth on the sample of *Bacillus mesentericus*

| Treatment with solvents alone | Strong |
|---|---|
| Active substance I: |  |
| (a) | Moderate |
| (b) | None |
| Active substance II: |  |
| (c) | Moderate |
| (d) | None |

What is claimed is:

1. Antifungal and antibacterial composition comprising a fungicidally and bactericidally effective amount of the compound of the formula

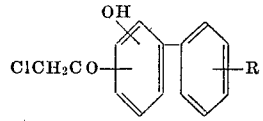

wherein R is hydrogen or monochloroacetyl with the limitation that when R is monochloracetyl, said R is in a p-position to the bond linking said two aromatic nuclei and an inert carrier.

2. A method for protecting and disinfecting a site from fungi and bacteria which comprises applying to such site a fungicidally and bactericidally effective amount of the compound of the formula

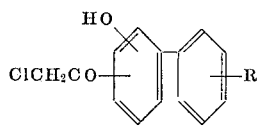

wherein hydrogen or monochloroacetyl with the limitation that when R is monochloroacetyl, said R is in a p-position to the bond linking said two aromatic nuclei.

3. An antifungal and antibacterial composition comprising a fungicidally and bactericidally effective amount of 2-hydroxy-5,4'-bis-chloroacetyl diphenyl and an inert carrier.

4. A method for protecting and disinfecting a site from fungi and bacteria which comprises applying to such site a fungicidally and bactericidally effective amount of the compound 2-hydroxy-5,4'-bis-chloroacetyl diphenyl.

References Cited

UNITED STATES PATENTS

| 2,403,945 | 7/1946 | Musser | 260—592X |
| 2,977,335 | 3/1961 | Havens | 260—592UX |
| 3,048,637 | 8/1962 | Havens et al. | 260—592 |
| 3,150,187 | 9/1964 | Cavillini et al. | 260—592 |
| 3,184,379 | 5/1965 | Lukes et al. | 424—331 |

ALBERT T. MEYERS, Primary Examiner

D. R. ORE, Assistant Examiner